(12) United States Patent
Sohan (10) Patent No.: US 11,910,790 B1
(45) Date of Patent: Feb. 27, 2024

(54) FISHING ROD RETRIEVING AND SALVAGING DEVICE

(71) Applicant: Sanjai Sohan, Fort Pierce, FL (US)

(72) Inventor: Sanjai Sohan, Fort Pierce, FL (US)

( * ) Notice: Subject to any disclaimer, the term of this patent is extended or adjusted under 35 U.S.C. 154(b) by 374 days.

(21) Appl. No.: 17/361,482

(22) Filed: Jun. 29, 2021

(51) Int. Cl.
| | |
|---|---|
| *A01K 93/02* | (2006.01) |
| *H04W 4/029* | (2018.01) |
| *A01K 97/10* | (2006.01) |
| *G01S 19/19* | (2010.01) |

(52) U.S. Cl.
CPC .............. *A01K 93/02* (2013.01); *A01K 97/10* (2013.01); *H04W 4/029* (2018.02); *G01S 19/19* (2013.01)

(58) Field of Classification Search
CPC ....... A01K 93/02; A01K 97/10; H04W 4/029; G01S 19/19; B63B 22/08; B63B 22/10; B63B 22/12; B63B 22/14
See application file for complete search history.

(56) References Cited

U.S. PATENT DOCUMENTS

| | | |
|---|---|---|
| 3,210,785 A | 10/1965 | Ward |
| D351,012 S | 9/1994 | Burghoff |
| 5,815,977 A | 10/1998 | Hill, Jr. |
| 6,036,559 A | 3/2000 | Arnold |
| 8,757,532 B2 | 6/2014 | Votel |
| 2007/0181079 A1 | 8/2007 | Fong |
| 2007/0266616 A1 | 11/2007 | Rienzo |
| 2008/0311805 A1* | 12/2008 | Spears ............... B63B 22/22 441/30 |
| 2011/0078938 A1* | 4/2011 | Aguzin ............... A01K 87/007 43/25 |
| 2014/0315452 A1* | 10/2014 | Greenfield ............ B63B 22/166 441/13 |

\* cited by examiner

*Primary Examiner* — Stephen P Avila
(74) *Attorney, Agent, or Firm* — Kyle A. Fletcher, Esq.

(57) ABSTRACT

The fishing rod retrieving and salvaging device comprises a balloon, a $CO_2$ cartridge, a valve, an activation sensor, a strobe, a recovery cable, and a housing. The fishing rod retrieving and salvaging device may be coupled to a protected item to prevent the protected item from becoming lost over water. As non-limiting examples, the protected item may be a fishing rod that may be dropped overboard from a boat. The fishing rod retrieving and salvaging device may inflate the balloon if the protected item is exposed to the water so that the protected item is prevented from sinking. In some embodiments, the fishing rod retrieving and salvaging device may attempt to send positional information to a smart phone to aid in locating the protected item.

18 Claims, 5 Drawing Sheets

FISHING ROD RETRIEVING AND SALVAGING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of sporting equipment, more specifically, a fishing rod retrieving and salvaging device.

SUMMARY OF INVENTION

The fishing rod retrieving and salvaging device comprises a balloon, a CO2 cartridge, a valve, an activation sensor, a strobe, a recovery cable, and a housing. The fishing rod retrieving and salvaging device may be coupled to a protected item to prevent the protected item from becoming lost over water. As non-limiting examples, the protected item may be a fishing rod that may be dropped overboard from a boat. The fishing rod retrieving and salvaging device may inflate the balloon if the protected item is exposed to the water so that the protected item is prevented from sinking. In some embodiments, the fishing rod retrieving and salvaging device may attempt to send positional information to a smart phone to aid in locating the protected item.

An object of the invention is to prevent a protected item from sinking by coupling a device to the protected item and inflating a balloon from within the device.

Another object of the invention is to inflate the balloon when the device is exposed to water.

A further object of the invention is to provide a strobe that flashes when the balloon is deployed.

Yet another object of the invention is to provide a GPS and transceiver to report the geolocation of the protected item to a smart phone.

These together with additional objects, features and advantages of the fishing rod retrieving and salvaging device will be readily apparent to those of ordinary skill in the art upon reading the following detailed description of the presently preferred, but nonetheless illustrative, embodiments when taken in conjunction with the accompanying drawings.

In this respect, before explaining the current embodiments of the fishing rod retrieving and salvaging device in detail, it is to be understood that the fishing rod retrieving and salvaging device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fishing rod retrieving and salvaging device.

It is therefore important that the claims be regarded as including such equivalent construction insofar as they do not depart from the spirit and scope of the fishing rod retrieving and salvaging device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 5.

The fishing rod retrieving and salvaging device 100 (hereinafter invention) comprises a balloon 200, a CO2 cartridge 210, a valve 220, an activation sensor 246, a strobe 240, a recovery cable 230, and a housing 250. The invention 100 may be coupled to a protected item to prevent the protected item from becoming lost over water 910. As non-limiting examples, the protected item may be a fishing rod 900 that may be dropped overboard from a boat. The invention 100 may inflate the balloon 200 if the protected item is exposed to the water 910 such that the protected item is prevented from sinking. In some embodiments, the invention 100 may attempt to send positional information to a smart phone 940 to aid in locating the protected item.

The balloon 200 may be an elastic bladder that may be inflated and deflated. When deflated, the balloon 200 may collapse and may be rolled for storage within a balloon cavity 260 of the housing 250. When inflated, the balloon 200 may expand into a spheroid shape. Expansion of the balloon 200 during inflation may push the balloon 200 out of the balloon cavity 260. The balloon 200 may be buoyant in the water 910 when inflated. The balloon 200 may keep both the invention 100 and the protected item afloat when inflated. A neck 202 of the balloon 200 may couple to the valve 220.

The $CO_2$ cartridge 210 may provide $CO_2$ gas that inflates the balloon 200. The $CO_2$ gas may be retained within the $CO_2$ cartridge 210 by the valve 220 when the valve 220 is in a CLOSED position. The $CO_2$ cartridge 210 may expel the $CO_2$ gas into the balloon 200 when the valve 220 is in an OPEN position. The $CO_2$ cartridge 210 may detachably couple to the valve 220. The $CO_2$ cartridge 210 may be replaceable.

The valve 220 may control the flow of the $CO_2$ gas from the $CO_2$ cartridge 210 to the balloon 200. The valve 220 may be in the CLOSED position by default. Responsive to activation by the activation sensor 246, the valve 220 may actuate by moving to the OPEN position. The $CO_2$ gas may pass from the $CO_2$ cartridge 210 to the balloon 200 when the valve 220 is in the OPEN position. In some embodiments, the valve 220 may be electromechanical such that the valve 220 is activated by applying an electrical potential to the valve 220.

The activation sensor 246 may complete an electrical circuit in the presence of the water 910. The activation sensor 246 may be coupled to the housing 250 of the invention 100 such that the activation sensor 246 may be exposed to the water 910 if the invention 100 is dropped into the water 910. The activation sensor 246 may comprise a set of electrical contacts that close in the presence of the water 910 in order to activate the activation sensor 246. In some embodiments, the activation sensor 246 may activate when the activation sensor 246 senses the pressure of the water 910 against the activation sensor 246. In some embodiments, the activation sensor 246 may activate when the activation sensor 246 senses electrical conductivity through the water 910.

The strobe 240 may comprise one or more sources of illumination that may be housed within the housing 250 under a strobe cover 256. The strobe 240 may be activated by applying the electrical potential to the strobe 240. The electrical potential may be provided by the activation sensor 246 when the activation sensor 246 is activated. As a non-limiting example, the one or more sources of illumination may be one or more LEDs 242. The strobe cover 256 may be a non-opaque, waterproof cover over the strobe 240 such that the strobe 240 may be visible outside of the housing 250.

A battery 244 may comprise one or more energy-storage devices. The battery 244 may be a source of electrical energy to operate the activation sensor 246, the valve 220, and the strobe 240. The battery 244 may be replaceable or rechargeable.

The recovery cable 230 may detachably couple the housing 250 to an attachment point such that the housing 250 may be retrieved. An internal end of the recovery cable 230 may be coupled to the housing 250. The recovery cable 230 may be coiled within a cable cavity 264 of the housing 250 until the recovery cable 230 is pulled out of the cable cavity 264. The recovery cable 230 may exit the cable cavity 264 via a cable aperture 254 located on a proximal end 268 of the housing 250. An external end of the recovery cable 230 may be coupled to a recovery fastener 232 which, in turn, may detachably couple to the attachment point. The attachment point may be an object which will remain above water even if the protected item falls into the water 910. As non-limiting examples, the attachment point may be a gunwale of the boat, a post of a pier, or other stationary of floating object. As a non-limiting example, the recovery cable 230 may be pulled out of the cable cavity 264 when the protected item is dropped.

The housing 250 may be a cylindrical cover that provides structural support and protects electrical components from water damage. The housing 250 may comprise a retention fastener 252, the cable cavity 264, the cable aperture 254, the strobe cover 256, the balloon cavity 260, and a balloon aperture 262. The housing 250 may be defined by the proximal end 268 and a distal end 266. The strobe 240 may be located at the distal end 266 of the housing 250. The recovery cable 230 may be deployed from the proximal end 268 of the housing 250.

The retention fastener 252 may be operable to detachably couple the housing 250 to the protected item. The retention fastener 252 may retain the housing 250 to the protected item while the protected item is in use. The retention fastener 252 may retain the protected item to the housing 250 and may keep the protected item at the surface of the water 910 when the protected item is dropped into the water 910.

The balloon cavity 260 may be operable to store the balloon 200 when the balloon 200 is deflated. The balloon 200 may exit the housing 250 via the balloon aperture 262 when the balloon 200 is inflated.

In some embodiments, the invention 100 may comprise a GPS 280 and a transceiver 282. The GPS 280 may be a Global Positioning System receiver. The GPS 280 may receive plurality of radio signals from satellites in the constellation of GPS satellites. The GPS 280 may perform calculations to determine geolocation and time information. The GPS 280 may deliver the geolocation information, the time information, or both to the transceiver 282. The transceiver 282 may transmit the geolocation information via a wireless signal 284 to the smart phone 940 such that a user may locate the protected item using the geolocation of the invention 100. As non-limiting examples, the wireless signal 284 may be a Bluetooth signal or a cell phone signal. The GPS 280 and the transceiver 282 may be activated by applying the electrical potential to the GPS 280 and the transceiver 282. The electrical potential may be provided by the activation sensor 246 when the activation sensor 246 is activated.

Figure 1:
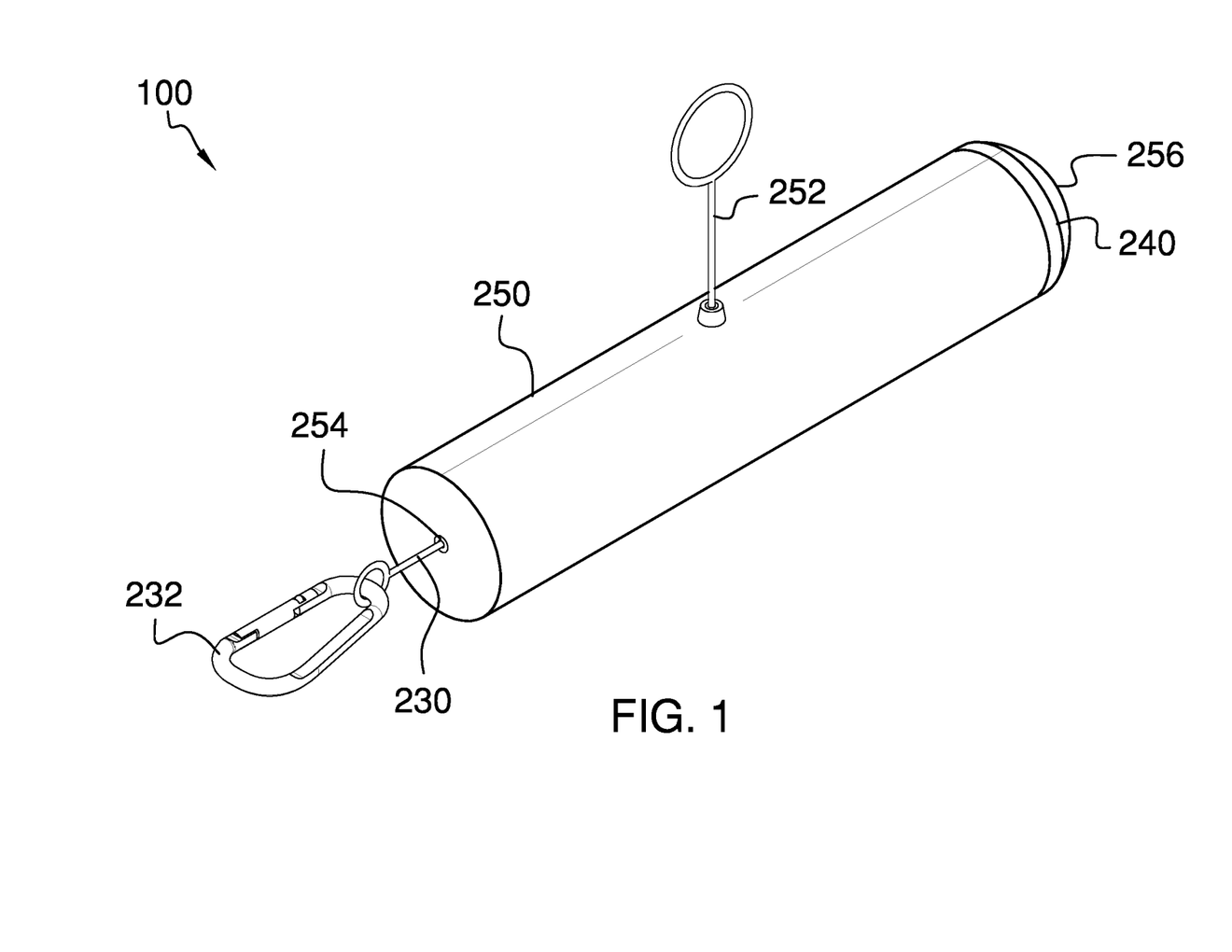
FIG. 1 is an isometric view of an embodiment of the disclosure.
Figure 2:
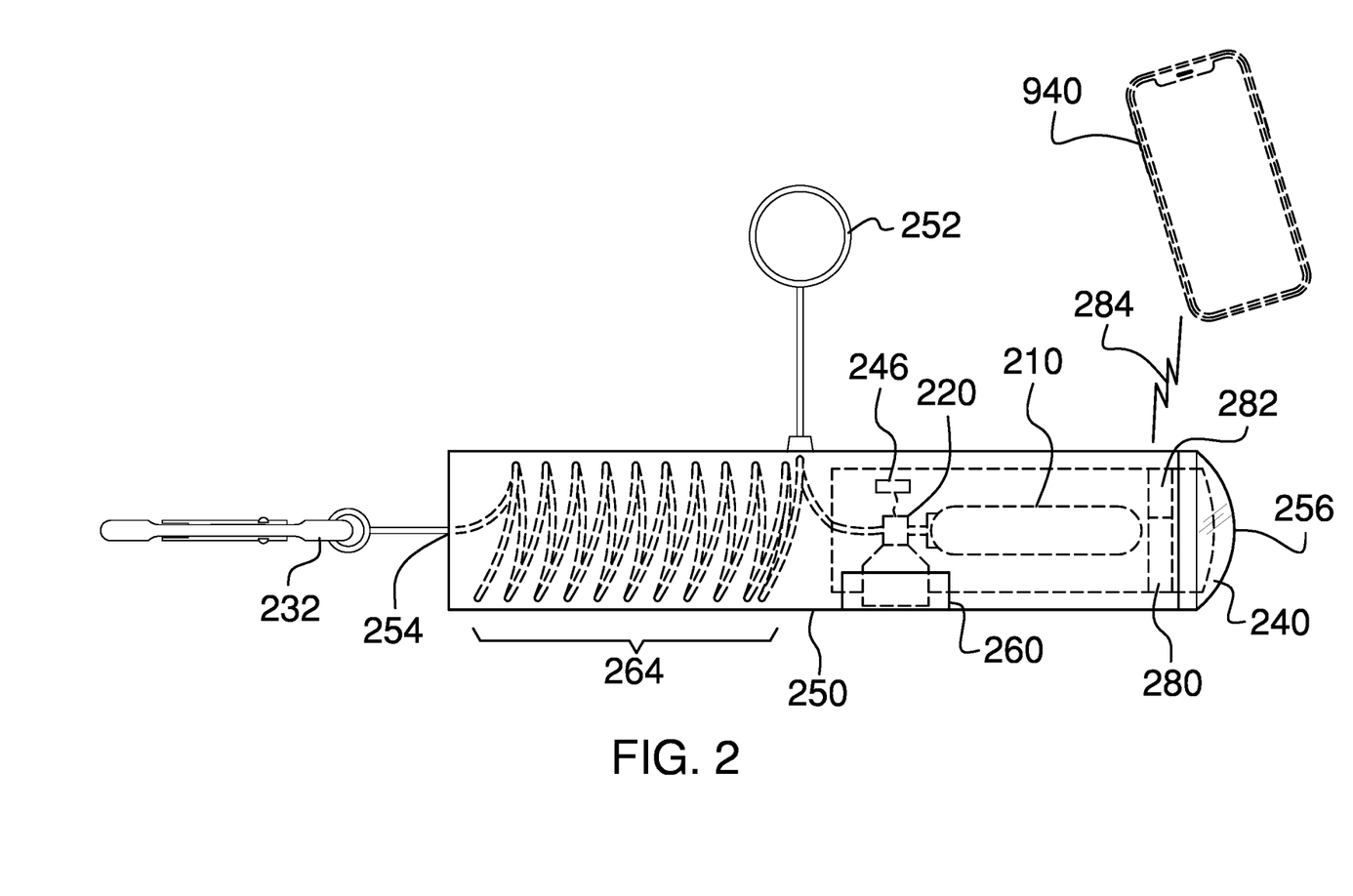
FIG. 2 is a side detail view of an embodiment of the disclosure.
Figure 3:
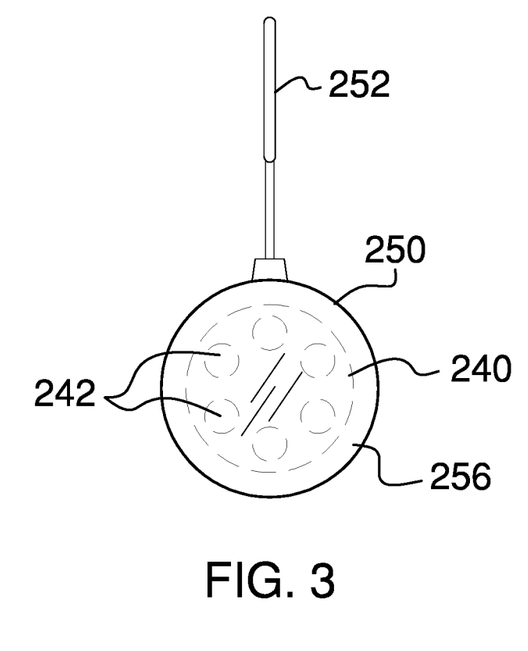
FIG. 3 is a front view of an embodiment of the disclosure.
Figure 4:
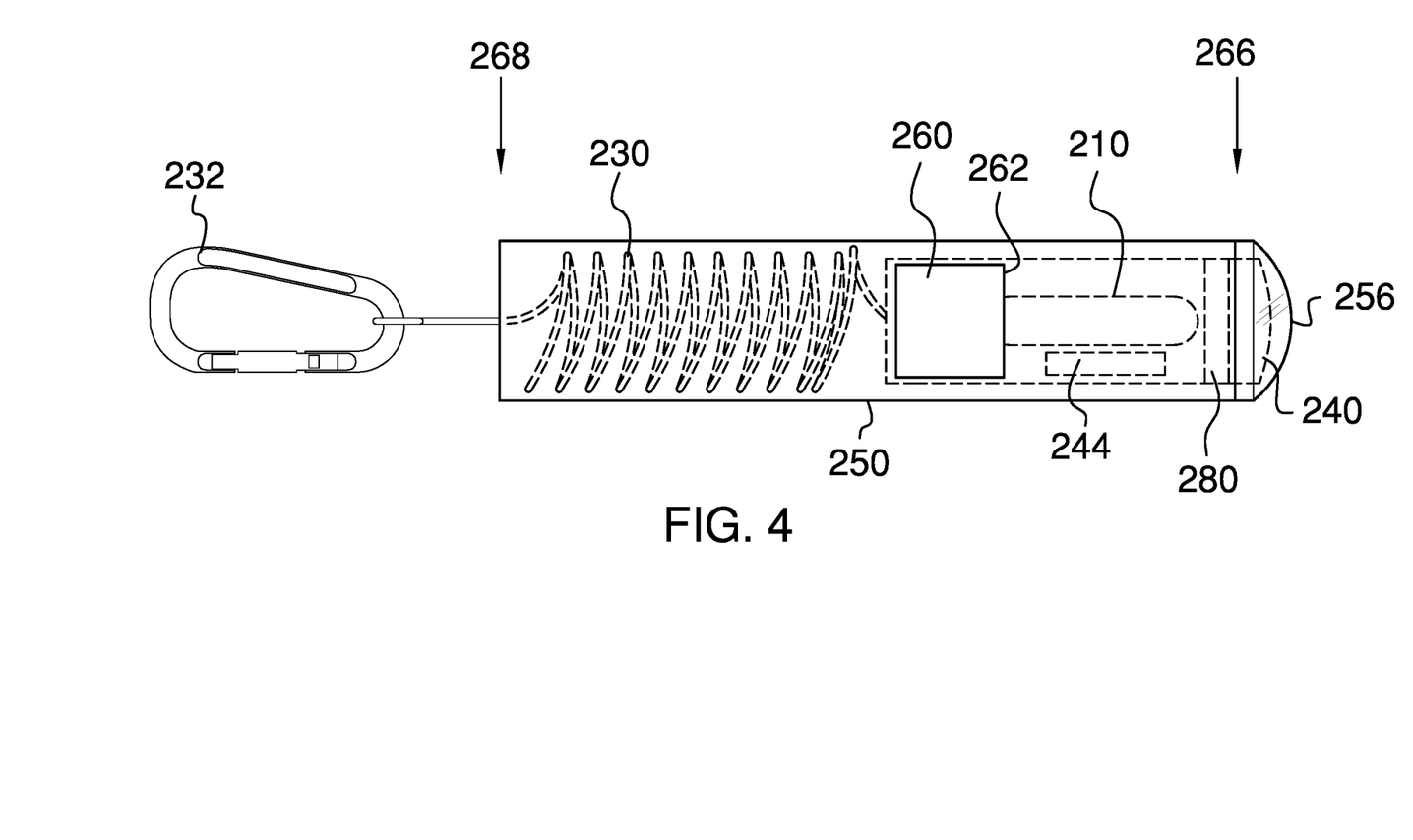
FIG. 4 is a bottom detail view of an embodiment of the disclosure.
Figure 5:
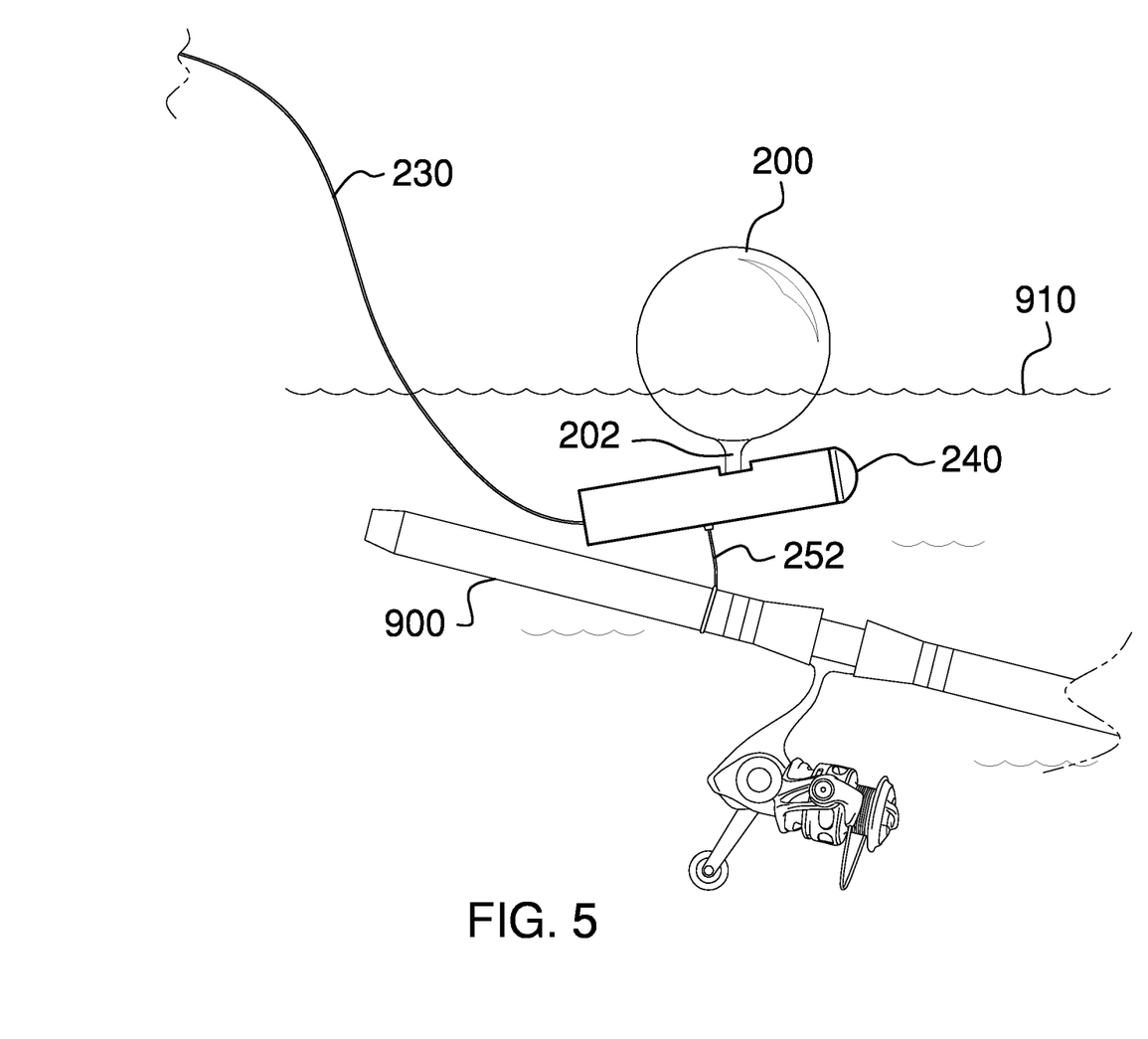
FIG. 5 is an in-use view of an embodiment of the disclosure.

In use, the retention fastener 252 may be coupled to a protected item such as a fishing rod 900. If the protected item is dropped into the water 910, the activation sensor 246 may activate the valve 220 to release the $CO_2$ gas from the $CO_2$ cartridge 210 into the balloon 200. As the balloon 200 inflates the balloon 200 may expand and push out of the balloon cavity 260. The buoyancy of the balloon 200 may cause the protected item to float near the surface of the water 910 where the protected item may be retrieved. In some cases, the protected item may be retrieved by simply pulling on the recovery cable 230 to bring the protected item to the boat. The activation sensor 246 may further activate the strobe 240 which may flash repeatedly to draw attention to the location of the protected item. In some embodiments, the activation sensor 246 may activate the GPS 280 and the transceiver 282 such that the invention 100 may transmit geolocation information to a smart phone 940. Using the geolocation information and a map application, the user may be able to drive the boat to the location of the protected item.

Definitions

As used in this disclosure, an "aperture" may be an opening in a surface. Aperture may be synonymous with hole, slit, crack, gap, slot, or opening.

As used herein, "balloon" may refer to an elastic bladder device that expands in volume when storing a pressurized gas. A balloon may be further defined with an envelope and a throat. The envelope may be that structural barrier of balloon within which the pressurized gas is contained. The throat may be a passage through which the pressurized gas is introduced into the balloon.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, "Bluetooth" may refer to a standardized communication protocol that is used to wirelessly interconnect electronic devices. Bluetooth® is a registered trademark of Bluetooth SIG.

As used in this disclosure, a "cavity" may be an empty space or negative space that is formed within an object.

As used herein, the words "couple", "couples", "coupled" or "coupling", may refer to connecting, either directly or indirectly, and does not necessarily imply a mechanical connection.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used in this disclosure, "elastic" may refer to a material or object that deforms when a force is applied to stretch or compress the material and that returns to its relaxed shape after the force is removed. A material that exhibits these qualities is also referred to as an elastomeric material.

As used in this disclosure, a "fishing rod" may be a tapered shaft to which a fishing line is attached. A fishing rod may have a fishing reel attached to the rod in order to retrieve the fishing line after the line has been cast.

As used herein, "GPS" may refer to a device that uses signals received from a system of navigational satellites to determine the position of the device. GPS is an acronym for Global Positioning System.

As used in this disclosure, a "housing" may be a rigid or semi-rigid casing that encloses and protects one or more devices.

As used herein, "non-opaque" may refer to the optical properties of an object that is either transparent or translucent.

As used in this disclosure, a "sensor" may be a device that quantitatively measures a physical stimulus.

As used herein, "smart phone" or "smartphone" may refer to a personal communication device that incorporates cellular phone calling and texting capabilities along with advanced features. Non-limiting examples of the advanced features of a smart phone may include camera functions, multimedia functions (such as music and video recording and playback and gaming), internet functions (such as web browsing and file uploading/downloading), and Global Positioning System capabilities. A smartphone may be able to execute downloaded application programs that expand the capabilities of the smartphone.

As used herein, "spheroid" may refer to a 3D shape that has circular symmetry and specifically includes spherical, ellipsoid, and ovoid shapes.

As used herein, "strobe" may refer to the act of illuminating a light intermittently and repeatedly.

As used in this disclosure, a "transceiver" may be a device that is used to transmit and/or receive signals. The signals may be audible, optical, or RF in nature.

As used in this disclosure, a "valve" may be a device that is used to control the flow of a fluid, either gas or liquid, through a pipe or to control the flow of a fluid into and out of a container. Some valves may have multiple ports and may allow the diverting or mixing of fluids.

As used herein, the word "waterproof" may refer to an object that is not harmed when being exposed to water, including total submersion for a period of time. When used as a verb, "waterproof" may refer to taking steps to make an object waterproof. Non-limiting examples of such steps may include applying special coatings or using gaskets to seal seams and entry points of an enclosure.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A fishing rod retrieving and salvaging device comprising:
    a balloon, a CO2 cartridge, a valve, an activation sensor, a strobe, a recovery cable, and a housing;
    wherein the fishing rod retrieving and salvaging device is coupled to a protected item to prevent the protected item from becoming lost over water;
    wherein the fishing rod retrieving and salvaging device inflates the balloon if the protected item is exposed to the water such that the protected item is prevented from sinking;
    wherein the balloon is an elastic bladder that is inflated and deflated;

wherein when deflated, the balloon collapses and is rolled for storage within a balloon cavity of the housing;

wherein the valve controls the flow of the CO2 gas from the CO2 cartridge to the balloon;

wherein the valve is electromechanical such that the valve is activated by applying an electrical potential to the valve.

2. The fishing rod retrieving and salvaging device according to claim 1 wherein when inflated, the balloon expands into a spheroid shape;

wherein expansion of the balloon during inflation pushes the balloon out of the balloon cavity;

wherein the balloon is buoyant in the water when inflated;

wherein the balloon keeps both the fishing rod retrieving and salvaging device and the protected item afloat when inflated;

wherein a neck of the balloon couples to the valve.

3. The fishing rod retrieving and salvaging device according to claim 2 wherein the CO2 cartridge provides CO2 gas that inflates the balloon;

wherein the CO2 gas is retained within the CO2 cartridge by the valve when the valve is in a CLOSED position;

wherein the CO2 cartridge expels the CO2 gas into the balloon when the valve is in an OPEN position.

4. The fishing rod retrieving and salvaging device according to claim 3 wherein the CO2 cartridge detachably couples to the valve;

wherein the CO2 cartridge is replaceable.

5. The fishing rod retrieving and salvaging device according to claim 4 wherein the valve is in the CLOSED position by default;

wherein responsive to activation by the activation sensor, the valve actuates by moving to the OPEN position;

wherein the CO2 gas passes from the CO2 cartridge to the balloon when the valve is in the OPEN position.

6. The fishing rod retrieving and salvaging device according to claim 5 wherein the activation sensor is coupled to the housing of the fishing rod retrieving and salvaging device such that the activation sensor is exposed to the water if the fishing rod retrieving and salvaging device is dropped into the water;

wherein the activation sensor comprises a set of electrical contacts that close in the presence of the water in order to activate the activation sensor.

7. The fishing rod retrieving and salvaging device according to claim 6 wherein the activation sensor activates when the activation sensor senses the pressure of the water against the activation sensor.

8. The fishing rod retrieving and salvaging device according to claim 6 wherein the activation sensor activates when the activation sensor senses electrical conductivity through the water.

9. The fishing rod retrieving and salvaging device according to claim 6 wherein the strobe comprises one or more sources of illumination that are housed within the housing under a strobe cover;

wherein the strobe is activated by applying the electrical potential to the strobe;

wherein the electrical potential is provided by the activation sensor when the activation sensor is activated.

10. The fishing rod retrieving and salvaging device according to claim 9 wherein the one or more sources of illumination are one or more LEDs.

11. The fishing rod retrieving and salvaging device according to claim 9 wherein the strobe cover is a non-opaque, waterproof cover over the strobe such that the strobe is visible outside of the housing.

12. The fishing rod retrieving and salvaging device according to claim 11 wherein a battery comprises one or more energy-storage devices;

wherein the battery is a source of electrical energy to operate the activation sensor, the valve, and the strobe;

wherein the battery is replaceable or rechargeable.

13. The fishing rod retrieving and salvaging device according to claim 12 wherein the recovery cable detachably couples the housing to an attachment point;

wherein an internal end of the recovery cable is coupled to the housing;

wherein the recovery cable is coiled within a cable cavity of the housing until the recovery cable is pulled out of the cable cavity;

wherein the recovery cable exits the cable cavity via a cable aperture;

wherein an external end of the recovery cable is coupled to a recovery fastener which, in turn, detachably couples to the attachment point.

14. The fishing rod retrieving and salvaging device according to claim 13 wherein the housing is a cylindrical cover that provides structural support and protects electrical components from water damage;

wherein the housing comprises a retention fastener, the cable cavity, the cable aperture, the strobe cover, the balloon cavity, and a balloon aperture;

wherein the housing is defined by a proximal end and a distal end;

wherein the strobe is located at the distal end of the housing;

wherein the recovery cable is deployed from the proximal end of the housing.

15. The fishing rod retrieving and salvaging device according to claim 14 wherein the retention fastener is operable to detachably couple the housing to the protected item;

wherein the retention fastener retains the housing to the protected item while the protected item is in use;

wherein the retention fastener retains the protected item to the housing and keeps the protected item at the surface of the water when the protected item is dropped into the water.

16. The fishing rod retrieving and salvaging device according to claim 15 wherein the balloon cavity is operable to store the balloon when the balloon is deflated;

wherein the balloon exits the housing via the balloon aperture when the balloon is inflated.

17. The fishing rod retrieving and salvaging device according to claim 16 wherein the fishing rod retrieving and salvaging device comprises a GPS and a transceiver;

wherein the GPS is a Global Positioning System receiver;

wherein the GPS receives plurality of radio signals from satellites in the constellation of GPS satellites;

wherein the GPS performs calculations to determine geolocation and time information;

wherein the GPS delivers the geolocation information, the time information, or both to the transceiver;

wherein the transceiver is adapted to transmit the geolocation information via a wireless signal to a smart phone such that a user locates the protected item using the geolocation of the fishing rod retrieving and salvaging device.

18. The fishing rod retrieving and salvaging device according to claim 17 wherein the GPS and the transceiver are activated by applying the electrical potential to the GPS and the transceiver;

wherein the electrical potential is provided by the activation sensor when the activation sensor is activated.

* * * * *